United States Patent
Zhou (10) Patent No.: US 10,735,817 B2
(45) Date of Patent: Aug. 4, 2020

(54) VIDEO PLAYBACK METHOD AND APPARATUS, AND COMPUTER READABLE STORAGE MEDIUM

(71) Applicant: TENCENT TECHNOLOGY (SHENZHEN) COMPANY LIMITED, Shenzhen (CN)

(72) Inventor: Bin Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/046,390

(22) Filed: Jul. 26, 2018

(65) Prior Publication Data
US 2018/0376216 A1  Dec. 27, 2018

Related U.S. Application Data

(63) Continuation of application No. PCT/CN2017/079676, filed on Apr. 7, 2017.

(30) Foreign Application Priority Data

Apr. 11, 2016 (CN) .......................... 2016 1 0221410

(51) Int. Cl.
*H04N 21/472* (2011.01)
*H04N 21/8541* (2011.01)
(Continued)

(52) U.S. Cl.
CPC . *H04N 21/47217* (2013.01); *H04N 21/23424* (2013.01); *H04N 21/44016* (2013.01);
(Continued)

(58) Field of Classification Search
CPC .............................................. H04N 21/47217
See application file for complete search history.

(56) References Cited

U.S. PATENT DOCUMENTS

2002/0053089 A1  5/2002 Massey
2004/0181667 A1  9/2004 Venters, III et al.
(Continued)

FOREIGN PATENT DOCUMENTS

CN  102469346 A  5/2012
CN  102630048 A  8/2012
(Continued)

OTHER PUBLICATIONS

The World Intellectual Property Organization (WIPO). International Search Report for PCT/CN2017/079676 dated Jun. 28, 2017 5 Pages (including translation).
(Continued)

*Primary Examiner* — Girumsew Wendmagegn
(74) *Attorney, Agent, or Firm* — Anova Law Group, PLLC (57) ABSTRACT

A video playback method and apparatus are provided. The method includes: receiving a first video clip of a video from a video server; playing back the first video clip; and receiving identifiers corresponding to M selectable second video clips of the video and a preset time, where M is an integer greater than 1. When the playback of the first video clip ends, the identifiers corresponding to the M selectable second video clips are displayed, and the preset time is counted down. If an identifier selected by a user is received in the preset time, the identifier selected by the user is sent to the video server. The method also includes playing back, when a second video clip sent by the video server according to the identifier selected by the user is received, the second video clip. The first video clip includes pre-interaction content of the second video clip.

14 Claims, 7 Drawing Sheets

(51) Int. Cl.
*H04N 21/845* (2011.01)
*H04N 21/234* (2011.01)
*H04N 21/44* (2011.01)
*H04N 21/4782* (2011.01)

(52) U.S. Cl.
CPC ..... *H04N 21/8456* (2013.01); *H04N 21/8541* (2013.01); *H04N 21/4782* (2013.01)

(56) References Cited

U.S. PATENT DOCUMENTS

| | | |
|---|---|---|
| 2006/0064733 A1 | 3/2006 | Norton et al. |
| 2013/0204919 A1 | 8/2013 | Kitazato |
| 2013/0268965 A1 | 10/2013 | Sherwin et al. |
| 2014/0115631 A1* | 4/2014 | Mak ................ H04N 21/23424 725/42 |
| 2016/0105724 A1* | 4/2016 | Bloch ................ H04N 21/2365 725/38 |
| 2017/0206569 A1* | 7/2017 | Reiley ................ G06Q 30/0277 |

FOREIGN PATENT DOCUMENTS

| | | |
|---|---|---|
| CN | 102955651 A | 3/2013 |
| CN | 104933603 A | 9/2015 |
| EP | 1255406 A1 | 11/2002 |
| EP | 2566158 A1 | 3/2013 |
| JP | 2002010215 A | 1/2002 |
| JP | 2002032403 A | 1/2002 |
| JP | 2006526204 A | 11/2006 |
| JP | 2008113247 A | 5/2008 |
| JP | 2011234301 A | 11/2011 |
| JP | 2013058817 A | 3/2013 |
| JP | 2016012763 A | 1/2016 |
| JP | 2016039548 A | 3/2016 |
| KR | 20150023251 A | 3/2015 |

OTHER PUBLICATIONS

Korean Intellectual Property Office (KIPO) Office Action 1 for 20187016737 dated Jul. 24, 2019 9 Pages (including translation).
The Japan Patent Office (JPO) Notification of Reasons for Refusal for Application No. 2018-531504 and Translation dated Aug. 19, 2019 11 Pages.

* cited by examiner

VIDEO PLAYBACK METHOD AND APPARATUS, AND COMPUTER READABLE STORAGE MEDIUM

RELATED APPLICATION

This application is a continuation application of PCT Patent Application No. PCT/CN2017/079676, filed on Apr. 7, 2017, which claims priority to Chinese Patent Application No. 201610221410.8, entitled "VIDEO PLAYBACK METHOD AND APPARATUS" filed with the Patent Office of China on Apr. 11, 2016, the entire contents of both of which are incorporated herein by reference.

FIELD OF THE TECHNOLOGY

This application relates to the field of communications technologies, and in particular, to a video playback method and apparatus.

BACKGROUND OF THE DISCLOSURE

Based on fast development of the Internet, videos are presented in a plurality of forms on the Internet, and are increasingly diversified. Therefore, how to perform video placement has become one research hotspot of current video technologies.

SUMMARY

In view of this, the present disclosure provides a video playback method. The method includes: receiving a first video clip of a video sent by a video server; and playing back the first video clip. The method also includes receiving, from the video server, identifiers corresponding to M selectable second video clips of the video and a preset time, M being an integer greater than 1. The method also includes displaying, when the playback of the first video clip ends, the identifiers corresponding to the M selectable second video clips, and counting down the preset time. If an identifier selected by a user is received in the preset time, the identifier selected by the user is sent to the video server. The method also includes playing back, when a second video clip sent by the video server according to the identifier selected by the user is received, the second video clip. The first video clip includes pre-interaction content of the second video clip.

The present disclosure further provides a video playback apparatus. The apparatus includes: a memory, a display, and a processor coupled to the memory and the display. The processor is configured to perform: receiving a first video clip of a video sent by a video server; playing back the first video clip; and receiving, from the video server, identifiers corresponding to M selectable second video clips of the video and a preset time. M is an integer greater than 1, The processor is also configured to perform: displaying, when the playback of the first video clip ends, the identifiers corresponding to the M selectable second video clips, and counting down the preset time. If an identifier selected by a user is received in the preset time, the identifier selected by the user is sent to the video server. The processor is also configured to perform: playing back, when a second video clip sent by the video server according to the identifier selected by the user is received, the second video clip. The first video clip includes pre-interaction content of the second video clip.

The present disclosure further provides a non-volatile computer readable storage medium, storing computer readable instructions. The computer readable instructions can cause at least one processor to perform: receiving a first video clip of a video sent by a video server; playing back the first video clip; and receiving, from the video server, identifiers corresponding to M selectable second video clips of the video and a preset time. M is an integer greater than 1. The computer readable instructions also cause the at least one processor to perform: displaying, when the playback of the first video clip ends, the identifiers corresponding to the M selectable second video clips, and counting down the preset time. If an identifier selected by a user is received in the preset time, the identifier selected by the user is sent to the video server. The computer readable instructions also cause the at least one processor to perform playing back, when a second video clip sent by the video server according to the identifier selected by the user is received, the second video clip. The first video clip includes pre-interaction content of the second video clip.

DESCRIPTION OF EMBODIMENTS

To make the objectives, technical solutions, and advantages of this application clearer and more comprehensible, the following describes technical solutions of this application in detail with reference to the accompanying drawings and embodiments.

Promotional videos or video advertisements can be inserted into online contents in various forms. In some examples, a promotional video is placed in an intra-frame form (i.e., adding/attaching the promotional video to an existing video such that the promotion video is played if a user selects streaming content of the existing video). However, the manner is in a single form, so as to limit user experience, and it is not easy to dig an interest point of a user.

In some examples, selectable icons are provided in the promotional video to solicit user selection. However, triggering performance of attracting a user to actively perform interaction and selection (e.g., click-through rate) may not be strong. Moreover, video placement is implemented in a probabilistic placement manner, and may not precisely find target audience to perform targeted video placement. Therefore, resource utilization of a video placement device is reduced.

The present disclosure provides a video playback method. A video can have a story form (e.g., Advertisement Story or Adstory) with a multi-split video presentation. That is, the video may include a primary video clip and a plurality of sub-video clips. The primary video clip (e.g., containing an introductory content) is played first, and after the primary video clip is played, the plurality of (for example, three) sub-video clips may be further provided to a user. In the story form, the plurality of sub-video clips (e.g., indicating different story developments/results from the introductory content of the primary video clip) may be presented simultaneously. The disclosed method includes: when playback of a first video clip used as a pre-interaction introduction of M second video clips ends, providing identifiers corresponding to the M second video clips that may be selected by a user, so that the user can actively select a second video clip to perform playback, so as to complete playback of a video. A video, as used herein, may refer to a group of video clips. The group of video clips may include a first video clip and multiple second video clips arranged in preset order (e.g., the first video clip precedes the second video clips during video playback, the multiple second video clips are parallel candidates for user selection, and a user-selected second video clip is played). In some embodiments, the video is a pre-roll video advertisement. The technical solution can improve a video device processing capability, and resource utilization, and improve an interest of a user in actively participating in video interaction.

In an embodiment of the present disclosure, the first video clip includes pre-interaction content of the second video clip(s), that is, content played back by the first video clip is a video pre-plot of the M second video clips, and the M second video clips are M video results of the first video clip.

Before video playback, a video server stores a to-be-played-back video.

The video server extracts video data corresponding to a common pre-plot of M to-be-processed video clips as the first video clip, and uses video data in each to-be-processed video other than the video data used as the first video clip, as a second video clip; and uses the first video clip corresponding to the M to-be-processed video clips and the M second video clips as one to-be-played-back video, and stores the to-be-played-back video. That is, in an embodiment of the present disclosure, a played-back video includes one first video clip and M second video clips. M is an integer greater than 1.

When the stored video needs to be played back, the video can be played back according to the following embodiment.

Implementation of a video playback process in this application is described in detail below with reference to the accompanying drawings.

In one embodiment, implementation of a video playback process is described from the perspective of a video client.

Figure 1:
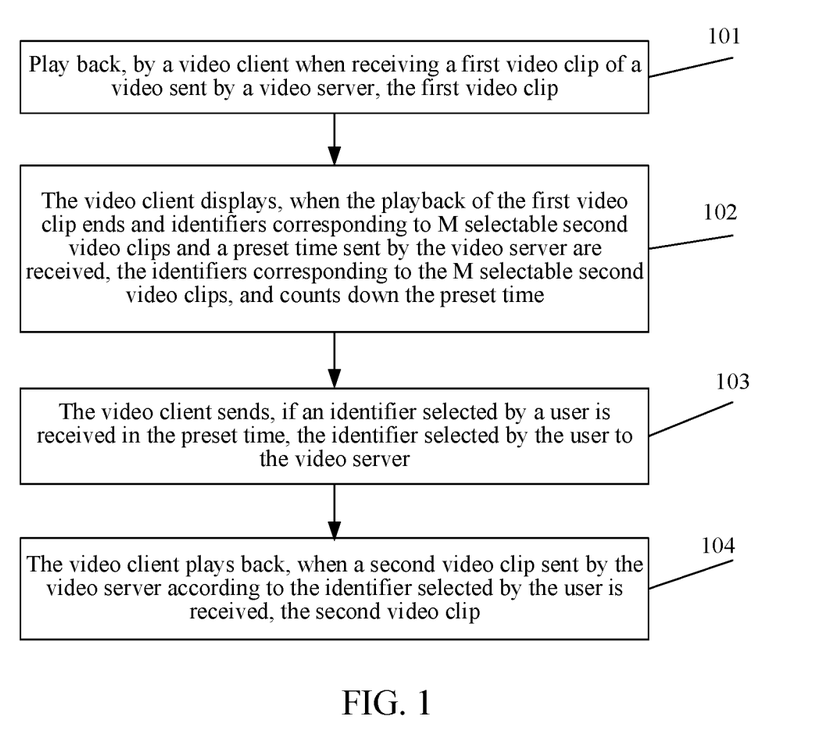
FIG. 1 is a schematic flowchart of video playback according to an embodiment of the present disclosure.

Referring to FIG. 1, FIG. 1 is a schematic flowchart of video playback according to an embodiment of the present disclosure. Specific steps are as follows:

Step 101. A video client plays back, when receiving a first video clip of a video sent by a video server, the first video clip.

When a video needs to be played back, the video server sends a first video clip of the video to the video client.

Step 102. The video client displays, when the playback of the first video clip ends and identifiers corresponding to M selectable second video clips and a preset time sent by the video server are received, the identifiers corresponding to the M selectable second video clips, and counts down the preset time.

The first video clip is sent by the video server to the video client, and the video server can learn a playback time of the first video clip. Therefore, before the playback of the first video clip ends, the identifiers corresponding to the M selectable second video clips of the video are sent to the video client, so that the video client displays the identifiers when the playback of the first video clip ends. For example, the first video clip is 15 seconds long, and the server may determine to send the identifiers when certain time has passed since sending the first video clip (e.g., 5 seconds after the first video clip is sent). The time for sending the identifiers of the M second video clips may vary based on network conditions.

The identifiers corresponding to the M selectable second video clips may be a description, a reminder or the like for a subsequent plot, and provide references for a user to select an identifier.

For example, there are two identifiers, one is "sunny", and the other is "rainy". Then, a reminder provided to the user is that one second video clip is a video for a sunny scenario and the other second video clip is a video for a rainy scenario. This is only an example, and an identifier is not limited to being provided in the reminding manner in the example.

When M identifiers are sent, a preset time is further sent, and this preset time is used as a countdown time for the user to select an identifier, such as 5 seconds. In some embodiments, a length of the preset time can be determined according to a length of the video and/or the M identifiers of the second video clips. In one example, the length of the preset time may be calculated by subtracting a length of the first video clip (e.g., 10 seconds) and a length of one of the second video clips having the longest length (e.g., 15 seconds) from a preset length threshold for a pre-roll video (e.g., 30 seconds). In addition, if result of such subtraction is less than a preset minimum length, the length of the preset time may be set to equal the minimum length. In another example, the length of the preset time may have a positive relation to the value M (i.e., the number of selectable second video clips). That is, the preset time is longer if the value M is higher, such as 6 seconds for two identifiers, and 9 seconds for three identifiers. In another example, the length of the preset time may have a positive relation to a total length of characters included in all of the M identifiers, such as 7 seconds for 10 characters, 10 seconds for 16 characters. These examples may allow sufficient time for a user to recognize available options and choose from them, and may also limit the total play time of the video in a desirable range.

The countdown based on the preset time may begin when the M identifiers are presented. Within this countdown, if the user selects an identifier, an identifier selected by the user is sent to the video client. If the identifier selected by the user is not received when the countdown ends, it is considered by default that the user does not select any identifier. In this case, the video client may send, to the video server, a message indicating that the user does not select any identifier, or may not send any message. As for which implementation is used, selection may be performed according to specific application.

In some embodiments, when receiving the identifiers corresponding to the M selectable second video clips sent by the video server, the video client displays the M identifiers as an overlay or a floating layer on a display background. For example, the display background may be an end scene of the first video clip, an image or a plurality of frames played in loop. In some embodiments, each identifier may include a text indicating plot keywords and/or a picture indicating trailer scenes of a corresponding second video clip. The picture may include one or more frames extracted from the second video clip.

In some embodiments, the video client differently displays the identifiers corresponding to the M selectable second video clips and a display background according to a manner specified in a performing notification by the video server. In other words, the video client differentiates the displaying of the identifiers corresponding to the M selectable second video clips and the displaying of a display background of the video.

During implementation, in one example, the background is darkened, and the M identifiers are highlighted. In other example, the M identifiers are displayed in a color different from that of the background, so that the M identifiers are relatively prominent, so that the user can easily see these M selectable identifiers. When deciding to select an identifier, the user only needs to select the identifier in a click/touch manner. In some embodiments, when a user cursor hovers on a first identifier and the first identifier include a first motion picture, the video client may playback the first motion picture to reveal further details corresponding to the second video clip corresponding to the first identifier; and when the user cursor hovers on a second identifier, the video client may playback a second motion picture, while the first motion picture is stopped. In some cases, the video client may playback the first motion picture and the second motion picture in sequence without detecting the hovering cursor. Additionally, different identifiers may be associated with different variations of the display background. The variations may be set based on color tone, brightness, background image, etc. When a motion picture of an identifier is playing or when a user cursor hovers on an identifier, the video client may present the display background according to a variation corresponding to the identifier.

In some embodiments of the present disclosure, the foregoing preset time may begin to be counted down when the playback of the first video clip ends. As an alternative solution, in some embodiments of the present disclosure, the foregoing preset time may begin to be counted down in a predetermined time before the playback of the first video clip ends (for example, 3 seconds or any time before the playback of the first video clip ends).

Step 103. The video client sends, if an identifier selected by a user is received in the preset time, the identifier selected by the user to the video server.

Step 104. The video client plays back, when a second video clip sent by the video server according to the identifier selected by the user is received, the second video clip.

When receiving the second video clip selected by the video server according to a preset rule because of not receiving the identifier selected by the user when the preset time reaches, the video client plays back the second video clip. In some embodiments of the present disclosure, the foregoing preset rule may be a predetermined sequence of playing back the second video clips or a random sequence. For example, if the identifier selected by the user is still not received when the foregoing preset time reaches, a first second video clip of the M second video clips may be directly played back; or, one random number m is randomly generated in a range of 1 to M, and an $m^{th}$ second video clip of the M second video clips is directly played back. That is, in an embodiment of the present disclosure, the second video clips are played back according to a priority selected by the user; and when the user performs no selection, the second video clips may be played back according to the preset rule such as the predetermined sequence or the random sequence.

In one embodiment, if the user does not select any identifier in the preset time, the user selects a second video clip according to the preset rule and plays back the second video clip; and the preset rule herein may be randomly selecting a second video clip, or may be preparing to play back a second video clip by default when the user performs no selection. A second rule is not limited herein.

Usually, when one video is played back, a period of time is displayed to the user in advance, so that the user learns the playback time of the video in advance, thereby selecting whether to watch the video. Therefore, to enhance user experience, during implementation of this application, the time for selecting an identifier for the user is not included in a playback time of one video. Specific implementation is as follows:

beginning playback time counting of the video when the playback of the first video clip begins;

pausing, by the video client, playback time counting of the video when the playback of the first video clip ends;

continuing the playback time counting of the video when the second video clip begins to be played back; and ending the playback time counting of the video when the playback of the second video clip ends.

Therefore, the playback time of the entire video is a total sum of the playback time of the first video clip and the playback time of the second video clip, such as 15 seconds, 30 seconds, or 45 seconds.

For time counting of one video, countdown may be performed in a timer manner, or time counting may be performed in a manner of increasing the time, which is not limited herein.

After the playback time counting of the video is paused when the playback of the first video clip ends, the preset time is counted in a countdown manner. In this way, the user may be reminded of a selected time length provided to the user. If the user still does not perform selection before the countdown ends, the video server actively provides one second video clip to be played back.

In one embodiment, implementation of a video playback process is described from the perspective of a video server.

Figure 2:
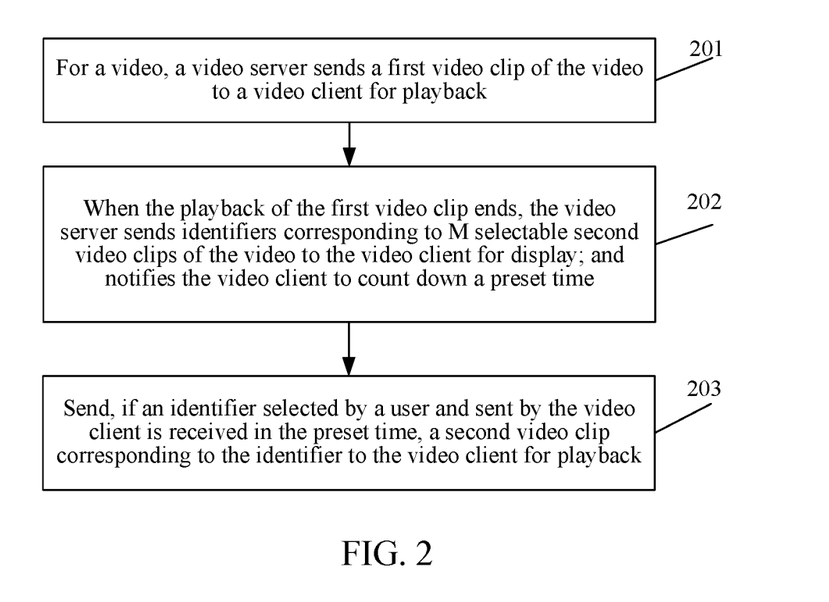
FIG. 2 is a schematic flowchart of video playback according to another embodiment of the present disclosure.

Referring to FIG. 2, FIG. 2 is a schematic flowchart of video playback according to an embodiment of the present disclosure. Specific steps are as follows:

Step 201. For a video, a video server sends a first video clip of the video to a video client for playback.

When a video needs to be played back, a first video clip of the to-be-played-back video is sent to the video client.

The video client plays back, when receiving the first video clip sent by the video server, the first video clip.

Step 202. When the playback of the first video clip ends, the video server sends identifiers corresponding to M selectable second video clips of the video to the video client for display; and notifies the video client to count down a preset time.

The video server can obtain the playback time of the first video clip. Before the playback of the first video clip ends, the video server sends the identifiers corresponding to the M selectable second video clips of the video to the video client, so that the video client displays the identifiers when the playback of the first video clip ends. A time delay problem is considered herein. The identifiers are sent to the video client before the playback of the first video clip ends, that is, before or when the playback of the first video clip ends, the video client receives the M identifiers sent by the server.

When receiving the identifiers corresponding to the M selectable second video clips sent by the video server, and the preset time, the video client displays M selectable identifiers, and begins to count down the preset time.

When sending the identifiers corresponding to the M selectable second video clips of the video to the video client for display, the video server notifies the video client to differently display the identifiers corresponding to the M selectable second video clips and a display background.

The video client differently displays the M selectable identifiers according to the notification of the video server.

When receiving, in the preset time, the identifier selected by the user, the video client sends the identifier selected by the user to a client; and if the identifier selected by the user is not received when the preset time is reached, the video client is responded to without any information.

Step 203. Send, if an identifier selected by a user and sent by the video client is received in the preset time, a second video clip corresponding to the identifier to the video client for playback.

If the identifier selected by the user and sent by the client is not received when the preset time is reached, a second video clip is selected according to the preset rule and sent to the video client for display.

The embodiments of the present disclosure are applied to a video system including a video server and a video client, where there may be one or more video clients, and a video playback process implemented by each video client is the same as that of the video client described with reference to FIG. 1; and there may also be one or more video servers, and when there is a plurality of video servers, the plurality of video servers jointly completes functions completed by the video server described with reference to FIG. 2.

Specifically, in some embodiments of the present disclosure, the foregoing video playback solution may be applied to playback of an interaction plot advertisement (Adplot). The interaction plot advertisement may include one primary plot advertisement and several branch plot advertisements. When playback of the primary plot advertisement is completed, the user may select, according to a reminder, a branch plot in which the user is interested, and continue watching, thereby implementing plot interaction. Specifically, in the foregoing solution, the first video clip and the M second video clips may form one interaction plot advertisement. For example, the first video clip is used as the primary plot advertisement, and content played back by the first video clip may be a video pre-plot of the M second video clips; and the M second video clips are M branch plot advertisements, and may be M video results of the primary plot advertisement. In this way, after completely watching the primary plot advertisement represented by the first video clip, the user may select, according to a plot reminder and an interest of the user, one of the M second video clips and continue to watch a branch plot, thereby implementing advertisement plot interaction.

A specific technical implementation method for playing back the foregoing interaction plot advertisement is described in detail below with reference to specific accompanying drawings and embodiments.

It should be noted that when a different client device is used as the foregoing video client, a specific technical implementation of playing back an interaction plot advertisement is also different. For example, when a personal computer (PC) is selected as the foregoing video client and a mobile terminal is selected as the foregoing video client, specific technical implementation of the foregoing solution is greatly different.

Specific technical implementation of playing back an interaction plot advertisement by using a PC is described in detail below by using an example in which a PC is used as the foregoing video client.

Specifically, in some embodiments of the present disclosure, the foregoing interaction plot advertisement may be implemented by using a FLASH rich media technology. A bottom layer of a system architecture of implementing an interaction plot advertisement is a video material player, and an upper layer of the video material player is a floating layer for plot selection. The video material player plays back the primary plot advertisement, and after the playback is completed, the video material player generates and presents one plot selection floating layer. After selection of the user is received (or when the user does not perform selection, selection may be performed according to the predetermined rule), the video material player continues to play back a selected branch plot advertisement. The foregoing video material player controls playback of the video material player and the plot selection floating layer according to advertisement parameters specified during advertisement placement. For example, according to a breakpoint time of the primary plot advertisement (for example, 10 seconds) and a branch plot selection time (for example, 5 seconds) in the advertisement parameters, the time in which the video material player plays back the primary plot advertisement (the first video clip) and the time in which the user selects the branch plot advertisement (the second video clip), that is, the preset time mentioned in the foregoing solution, are set.

Specifically, when the video player of the PC end begins to play back the foregoing interaction plot advertisement, the interaction plot advertisement is played back by the video material player at the bottom layer as the first video clip of the primary plot advertisement, and meanwhile a first timer is started, and configured to control the playback time of the foregoing primary plot advertisement. When the first timer counts the breakpoint time of the primary plot advertisement, the video material player pauses playback of the primary plot advertisement, and generates the plot selection floating layer, so as to display identifier of M second video clips as branch plot advertisements for the user to perform selection. Meanwhile, a second timer is started, and configured to control the user to select the time of the branch plot advertisement. If the user selects an identifier of a branch plot advertisement before the second timer counts the preset time, the video material player plays back the branch plot advertisement selected by the user; or if the user does not select an identifier of a branch plot advertisement when the second timer counts the preset time, the video material player plays back a branch plot advertisement selected according to the predetermined rule.

Figure 3:
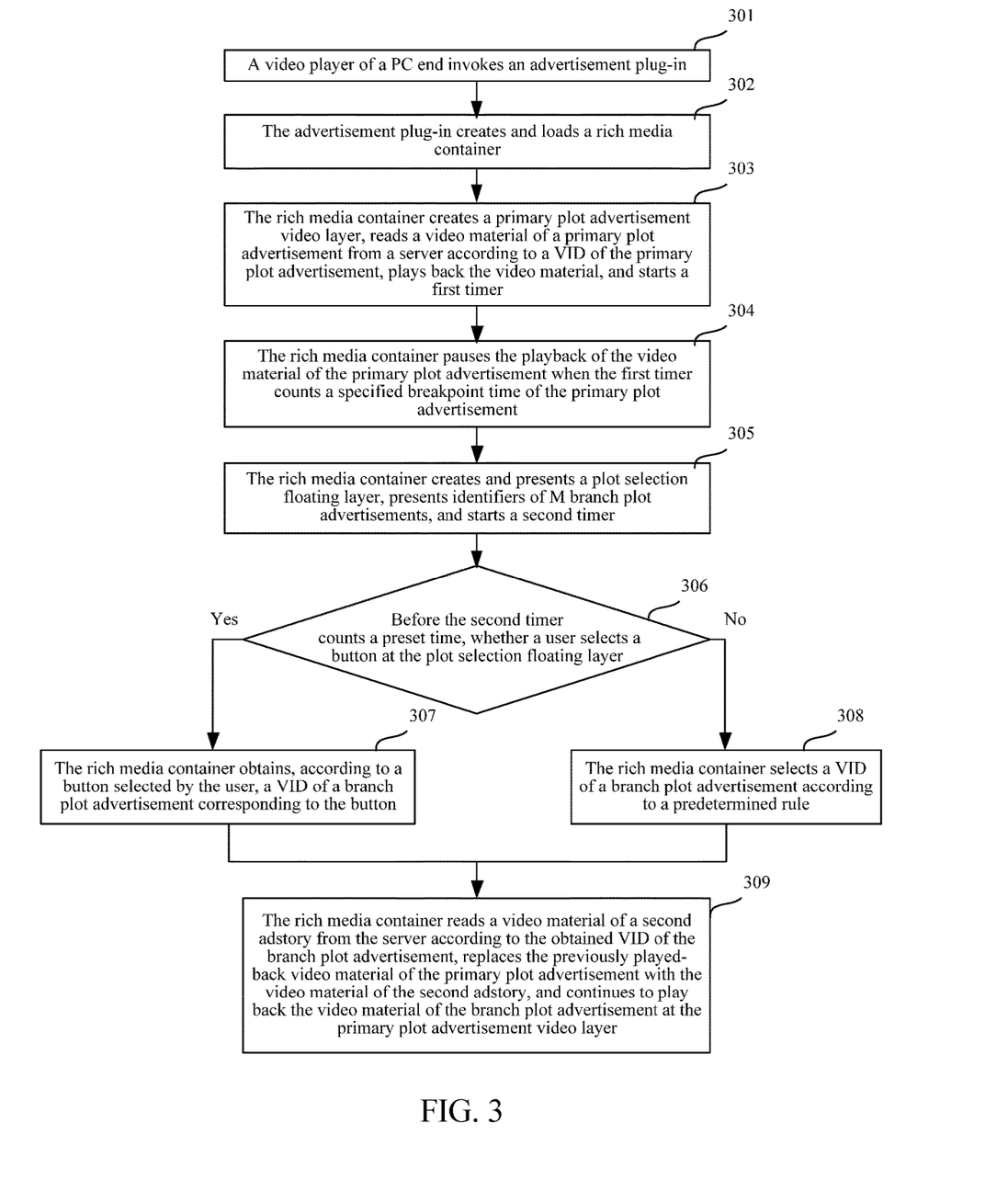
FIG. 3 shows an embodiment of a process of implementing Adplot playback at a PC end.

FIG. 3 shows an embodiment of a process of implementing Adplot playback at a PC end. As shown in FIG. 3, the method includes the following steps.

Step 301. A video player of a PC end invokes an advertisement plug-in on the video player.

In some embodiments of the present disclosure, in a process in which the PC end plays back a video, an advertisement needs to be inserted at a predetermined location according to a broadcasting/insertion requirement. To complete advertisement insertion, before advertisement insertion, the video server may inform the video player of the PC of information such as a location at which an advertisement needs to be inserted, a type of the inserted advertisement, and a video identifier (VID, Video ID) of the inserted advertisement in advance. Then, the video player of the PC end invokes an advertisement plug-in on the video player at the advertisement insertion location to complete corresponding advertisement playback.

In one embodiment, the type of the inserted advertisement is an interaction plot advertisement (Adplot), and in this case, the video identifier of the inserted advertisement is the video identifier of the primary plot advertisement. In addition, the advertisement plug-in further obtains other advertisement parameters of the interaction plot advertisement from the server, for example, a quantity, copies, and video identifiers (VID) of second video clips as branch plot advertisements, the breakpoint time of the primary plot advertisement, and the preset time in which the user selects the branch plot advertisements.

Step 302. The advertisement plug-in determines that a type of an inserted advertisement is an interaction plot advertisement, and creates and loads a rich media container configured to present the interaction plot advertisement.

In some embodiments of the present disclosure, an advertisement of the interaction plot advertisement type is presented by using the rich media container loaded by the advertisement plug-in. The rich media container may be created and loaded by the advertisement plug-in. As described above, in the process in which the advertisement plug-in creates the rich media container, various advertisement parameters specified when the interaction plot advertisement is placed need to be obtained, for example, the VID of the primary plot advertisement (that is, the video identifier of the first video clip), the quantity of, the copies and VIDs of the branch plot advertisements (that is, the second video clips), the breakpoint time of the primary plot advertisement, and the preset time in which the user selects the second video clips.

Step 303. The rich media container creates a primary plot advertisement video layer, reads a video material of a primary plot advertisement from a server according to a VID of the primary plot advertisement, plays back the video material, and starts a first timer, to count a playback time of the primary plot advertisement. In some embodiments, the first timer may be started simultaneously as the first video clip starts playing.

The primary plot advertisement video layer may be considered as a video material player.

In some embodiments of the present disclosure, the rich media container obtains an address of the primary plot advertisement from the server according to the VID of the primary plot advertisement, and reads the video material of the primary plot advertisement according to the address.

In some embodiments of the present disclosure, if the VID of the primary plot advertisement is not obtained or the video material of the primary plot advertisement cannot be read according to the VID of the primary plot advertisement, an advertisement playback error may be reported and this advertisement may be removed.

Step 304. The rich media container pauses the playback of the video material of the primary plot advertisement when the first timer counts a specified breakpoint time of the primary plot advertisement.

Step 305. The rich media container creates and presents a plot selection floating layer, presents identifiers of M branch plot advertisements, and starts a second timer, to count time in which a user selects the branch plot advertisements. In some embodiments, the second timer may be started simultaneously when the identifiers are presented.

In some embodiments of the present disclosure, the plot selection floating layer presents a corresponding option button according to a quantity of plots that is specified when the interaction plot advertisement is placed (that is, a quantity of the second video clips), and copies (that is, the identifiers of the M second video clips), for the user to perform selection.

Step 306. If the user selects a button at the plot selection floating layer before the second timer counts the preset time, perform step 307; otherwise, perform step 308.

Step 307. The rich media container obtains, according to a button selected by the user, a VID of a branch plot advertisement corresponding to the button, and then performs step 309.

Step 308. The rich media container selects a VID of a branch plot advertisement according to a predetermined rule, and then performs step 309.

As described above, the predetermined rule may be a manner such as performing selection according to a predetermined sequence or performing selection randomly.

Step 309. The rich media container reads a video material of a second video clip from the server according to the obtained VID of the branch plot advertisement, replaces the previously played-back video material of the primary plot advertisement with the video material of the second video clip, and continues to play back the video material of the branch plot advertisement at the primary plot advertisement video layer.

In some embodiments of the present disclosure, the rich media container obtains an address of the branch plot advertisement from the server according to the VID of the selected branch plot advertisement, and reads the video material of the branch plot advertisement according to the address.

It may be seen from the foregoing process that, the playback of the interaction plot advertisement is implemented by using the rich media container created and loaded by the advertisement plug-in, and the rich media container is created according to external parameters specified when the interaction plot advertisement is placed. During implementation, the rich media container creates, according to these external parameters, the primary plot advertisement video layer at which the user plays back video content and the plot selection floating layer used to interact with the user, thereby playing back the interaction plot advertisement. Specifically, in some embodiments of the present disclosure, the first timer and the second timer may be implemented by starting Flash AS3.0 code carried in the PC end.

Specific technical implementation of playing back an interaction plot advertisement by using a mobile terminal is described in detail below by using an example in which a mobile terminal is used as the foregoing video client.

In some embodiments of the present disclosure, in a technical solution in which the mobile terminal plays back an interaction plot advertisement, the interaction plot advertisement may be implemented by using front-end technologies such as HTML5 on the mobile terminal side, Java Script (JS), and Cascading Style Sheet 3 (CSS3). A lowest layer of a system architecture of implementing an interaction plot advertisement is a video playback application (for example, Tencent video APP), an advertisement plug-in of the video playback application is one WebView page, and in the WebView page, all functions such as pausing playback of original video content, creating the video material player, starting the first timer, creating the plot selection floating layer, and starting the second timer are implemented.

Figure 4:
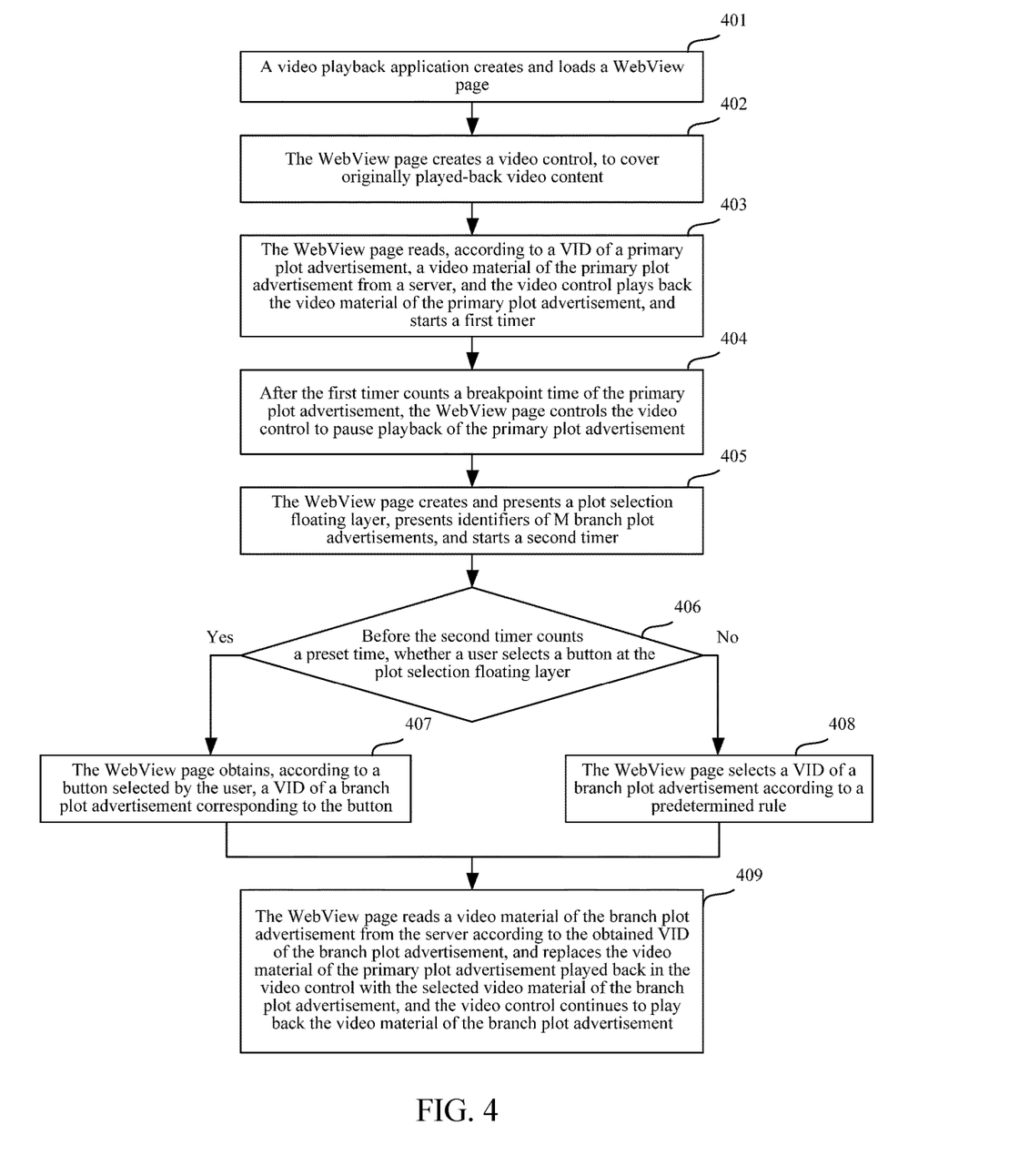
FIG. 4 shows an embodiment of a process of implementing Adplot playback on a mobile terminal side.

FIG. 4 shows an embodiment of a process of implementing Adplot playback on a mobile terminal side. As shown in FIG. 4, the method includes the following steps.

Step 401. A video playback application on a mobile terminal side creates and loads a WebView page by loading an advertisement software development kit (SDK) on the video playback application.

In some embodiments of the present disclosure, if a user chooses to watch a video by using a video playback application in a tablet computer (PAD) or a mobile phone, in a case of inserting an advertisement, the video playback application requests an advertisement SDK to obtain related data of the inserted advertisement from a server. When an advertisement of the AdPlot type is inserted, the advertisement SDK creates and loads one empty WebView page, and meanwhile transfers parameters corresponding to the inserted AdPlot advertisement to the WebView page. The WebView page is used as an AdPlot plug-in container. Subsequently, by the WebView page creates a video material player (also referred to as video control) and a plot selection floating layer according to the parameters corresponding to the inserted AdPlot advertisement and a presentation platform.

It should be noted that after the WebView page is created as the AdPlot plug-in container, the WebView page first determines, according to the MRAID protocol formulated by the Internet Architecture Board (IAB), whether an interaction protocol is established between the WebView page and the advertisement SDK. The MRAID protocol is one international standard protocol formulated by the IAB, and formulates a rich media interaction protocol between the WebView page and a mobile application (APP). If the interaction protocol between the WebView page and the advertisement SDK is established unsuccessfully, error information indicating that the advertisement cannot be presented pops up, and the advertisement is removed. If the interaction protocol between the WebView page and the advertisement SDK is established successfully, it indicates that the WebView page may perform data exchange with the video playback application in the mobile terminal by using this protocol. Therefore, advertisement parameters of an interaction plot advertisement may be obtained from the advertisement SDK.

The advertisement parameters of the interaction plot advertisement mainly include: a VID of a first video clip as a primary plot advertisement, a quantity, copies, and VIDs of second video clips as branch plot advertisements, a breakpoint time of the primary plot advertisement, a preset time in which the user selects the branch plot advertisements, and the like.

Step 402. The WebView page suspends playback of video content originally played back in the video playback application, creates a video control according to advertisement parameters of an interaction plot advertisement that are obtained from the advertisement SDK, and covers the originally played-back video content by using the video control.

Step 403. The WebView page reads, according to a VID of a primary plot advertisement, a video material of the primary plot advertisement from a server, and the video control plays back the video material of the primary plot advertisement, and starts a first timer, to count a playback time of the primary plot advertisement.

In some embodiments, the video control may be used as a video material player.

As described above, the WebView page may obtain an address of the first video clip from the server according to the VID of the first video clip, and then read a video material of the first video clip according to the address of the first video clip and play back the video material.

Moreover, the WebView page may set the first timer according to the breakpoint time of the primary plot advertisement obtained from the advertisement SDK, and the first timer is configured to count the playback time of the primary plot advertisement.

Step 404. After the first timer counts a breakpoint time of the primary plot advertisement, the WebView page controls the video control to pause playback of the primary plot advertisement.

Step 405. The WebView page creates and presents a plot selection floating layer, presents identifiers of M branch plot advertisements, and meanwhile starts a second timer, to count time in which a user selects the branch plot advertisements.

In some embodiments of the present disclosure, the plot selection floating layer presents a corresponding option button according to parameters such as a quantity of plots that is specified when the interaction plot advertisement is placed (that is, a quantity of the second video clips), and copies (that is, the identifiers of the M second video clips).

Step 406. If the user selects a button at the plot selection floating layer before the second timer counts the preset time, perform step 407; otherwise, perform step 408.

Step 407. The WebView page obtains, according to a button selected by the user, a VID of a branch plot advertisement corresponding to the button, and then performs step 409.

Step 408. The WebView page obtains a VID of a branch plot advertisement according to a predetermined rule, and then performs step 409.

Step 409. The WebView page reads a video material of the branch plot advertisement from the server according to the obtained VID of the branch plot advertisement, and replaces the video material of the primary plot advertisement played back in the video control with the selected video material of the branch plot advertisement, and the video control continues to play back the video material of the branch plot advertisement It may be seen from the foregoing process that, the playback of the interaction plot advertisement is implemented by using the WebView page that is created and loaded, and the WebView page is created according to external parameters specified when the interaction plot advertisement is placed. During implementation, the WebView page creates, according to these external parameters, the video control through which the user plays back video content and the plot selection floating layer used to interact with the user, thereby playing back the interaction plot advertisement. Specifically, in some embodiments of the present disclosure, the first timer and the second timer may be implemented by starting JS code carried in the mobile terminal side.

Therefore, it may be seen that, the interaction plot advertisement may be played back by using the technical solution. Moreover, the technical solution can improve a video device processing capability, and resource utilization.

A person skilled in the art may understand that, an advertisement inserted in a video is limited by a total time length of the inserted advertisement, for example, 30 seconds or 45 seconds.

Then, if the total time length of the inserted advertisement is still not satisfied after the first video clip used as the primary plot advertisement and the second video clip used as the branch plot advertisement are both played back completely by using the foregoing method, that is, the playback time of the first video clip plus the playback time of the second video clip is less than a preset total time length of the inserted advertisement, the process may return to step 305 or 405 again, that is, the plot selection floating layer is created again, and the user is requested to again select the second video clip used as the branch plot advertisement. It should be noted that in some embodiments of the present disclosure, the plot selection floating layer created again may not include an identifier of a second video clip previously played back, thereby avoiding repetitive playback of a same second video clip. In some other embodiments of the present disclosure, the plot selection floating layer created again may still include an identifier of a second video clip previously played back, thereby allowing the user to perform selection again. Certainly, during implementation, the location of the identifier of the second video clip at the plot selection floating layer may be adjusted, for example, the identifier of the second video clip is placed behind an identifier of another second video clip. A specific presentation manner is not limited in this application. Certainly, it may also be understood that, in a case in which the previously played-back second video clip is a second video clip selected according to the predetermined rule, if the identifier of the second video clip selected by the user is still not received in the predetermined time this time, the previously played-back second video clip may not be selected when selection is performed again according to the predetermined rule.

Corresponding to the foregoing situation, if the playback time of the first video clip plus the playback time of the second video clip is greater than the preset total time length of the inserted advertisement, additional processing needs to be performed.

In some embodiments of the present disclosure, filtering processing may be performed in advance on the second video clips used as the branch plot advertisements, and a second video clip whose playback time plus the playback time of the first video clip is greater than the specified total time length of the inserted advertisement is filtered out from the M second video clips. That is, if a playback time of a second video clip plus the playback time of the first video clip is greater than the specified total time length of the inserted advertisement, an identifier of this second video clip is not provided to the user for selection. In other words, the disclosed method may further include: filtering out in advance, from the M second video clips, a second video clip whose playback time is greater than a difference between a specified total playback time and a playback time of the first video clip. Therefore, it is ensured that all second video clips provided to the user for selection may be played back completely in the predetermined total time length.

In some other embodiments of the present disclosure, the second video clips may not be filtered according to the playback time length of the second video clips, that is, the identifiers of the M second video clips are all provided to the user to perform selection. In this case, when a playback time of a second video clip plus the playback time of the first video clip is greater than the specified total time length of the inserted advertisement, in a case in which the specified total time length of the inserted advertisement is reached, even if playback of the second video clip is not complete, the second video clip being played back may be stopped from being played back. Alternatively, as an alternative solution of the foregoing solution, when the specified total time length of the inserted advertisement is reached, the user is reminded that the current video is not played back completely, and the user is requested to select whether to continue playback. In this case, if the user chooses to continue playback, the second video clip continues to be played back, and after the playback is completed, the process returns to play back a video film; or if the user chooses to not continue playback, playback of the second video clip ends, and the process returns to play back a video film.

A view of specific application of implementing video playback according to this application is provided below.

Figure 5:
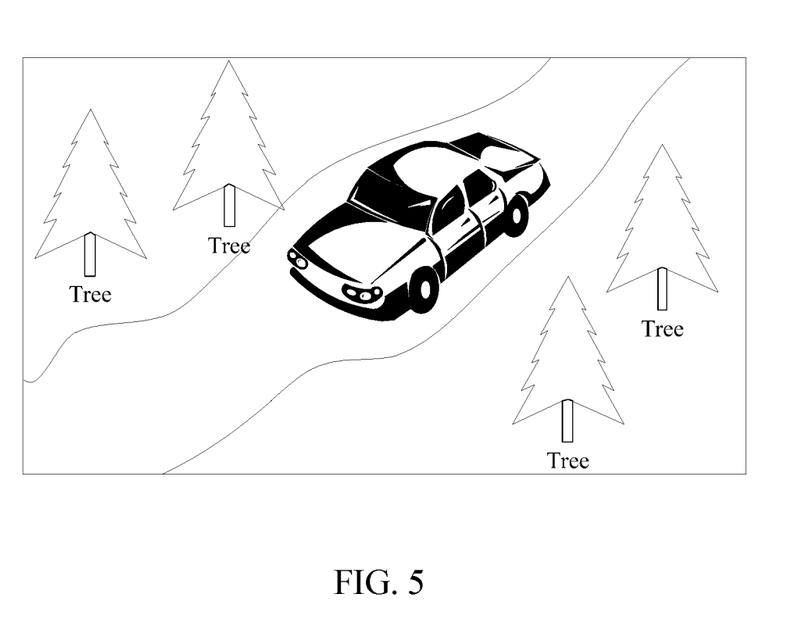
FIG. 5 is a schematic diagram of a picture in which playback of a first video clip ends according to this application.

Referring to FIG. 5, FIG. 5 is a schematic diagram of a picture in which playback of a first video clip ends according to an embodiment of the present disclosure. In FIG. 5, when the playback of the first video clip ends, a picture stays on a final frame of image, and the image shows an automobile being driven on a road.

Figure 6:
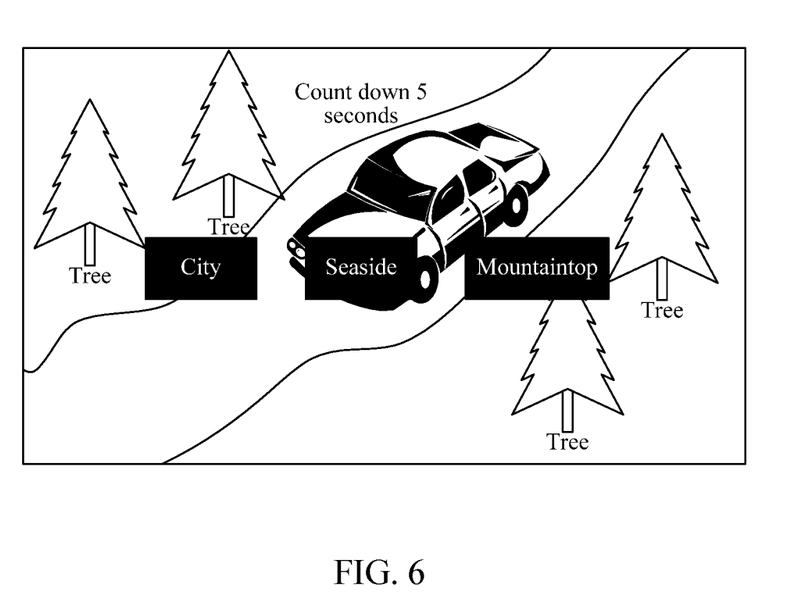
FIG. 6 is a schematic diagram of displaying identifiers of three selectable second video clips when playback of a first video clip ends according to an embodiment.

Referring to FIG. 6, FIG. 6 is a schematic diagram of displaying identifiers of three selectable second video clips when playback of a first video clip ends according to an embodiment.

In FIG. 6, three identifiers are provided as an example, and optional identifiers of three second video clips corresponding to subsequent development of the first video clip, and countdown of a preset time being 5 seconds are provided as an example.

A first identifier is city, that is, it reminds that the automobile is about to be driven to a city, and a plot corresponding to a subsequent video is a plot that occurs in the city; a second identifier is seaside, that is, it reminds that the automobile is about to be driven to a seaside, and a plot corresponding to a subsequent video is a plot that occurs in the seaside; and a third identifier is mountaintop, that is, it reminds that the automobile is about to be driven to a mountaintop, and a plot corresponding to a subsequent video is a plot that occurs on the mountaintop.

The user may select one of the identifiers according to an interest, and if the user selects a seaside, a second video clip corresponding to the seaside is played back in the video client; and if the user performs no selection in the countdown time, the background video server selects one video clip according to the preset rule. If the background video server selects a mountaintop, a second video clip corresponding to the mountaintop is played back in the video client.

Figure 7:
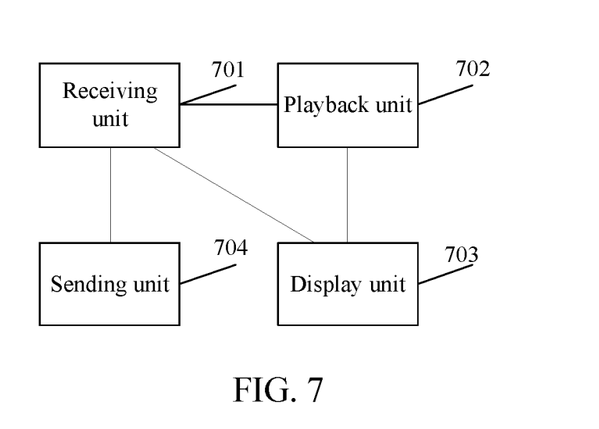
FIG. 7 is a schematic structural diagram of an apparatus according to an embodiment of the present disclosure.

Based on a same inventive idea, an embodiment of the present disclosure provides a video playback apparatus. Referring to FIG. 7, FIG. 7 is a schematic structural diagram of an apparatus applied to the technology described with reference to FIG. 1 according to this application. The apparatus includes: a receiving unit 701, a playback unit 702, a display unit 703, and a sending unit 704.

The receiving unit 701 is configured to receive a first video clip sent by a video server; receive identifiers corresponding to M selectable second video clips that are used to display a video and that are sent by the video server and a preset time; receive an identifier selected by a user; and receive a second video clip sent by the video server.

The playback unit 702 is configured to play back, when the receiving unit 701 receives a first video clip of any video sent by the video server, the first video clip; and play back, when the receiving unit 701 receives a second video clip sent by the video server according to the identifier selected by the user, the second video clip, the first video clip being an interaction pre-roll video clip of the second video clip; and M being an integer greater than 1.

The display unit 703 is configured to display, when the playback unit 702 ends the playback of the first video clip and the receiving unit 701 receives the identifiers corresponding to the M selectable second video clips that are used to display the video and that are sent by the video server and the preset time, the identifiers corresponding to the M selectable second video clips, and count down the preset time.

The sending unit 704 is configured to send, if the receiving unit 701 receives the identifier selected by the user in the preset time, the identifier selected by the user to the video server.

In some embodiments, the playback unit 702 is further configured to pause playback time counting of the video when the playback of the first video clip ends; continue the playback time counting of the video when the second video clip begins to be played back; and end the playback time counting of the video when the playback of the second video clip ends.

In some embodiments, the display unit 703 is further configured to differently display the identifiers corresponding to the M selectable second video clips and a display background in a manner of performing notification by the video server.

Figure 8:
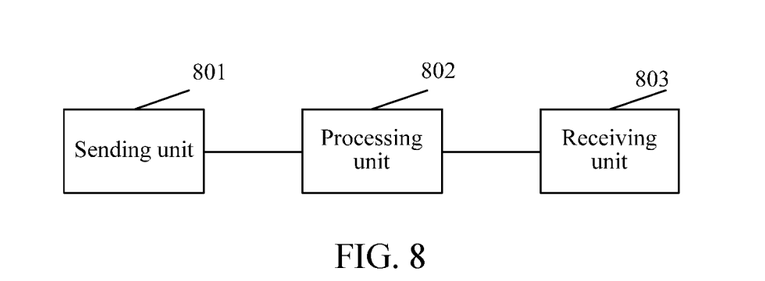
FIG. 8 is a schematic structural diagram of an apparatus according to another embodiment of the present disclosure.

Based on a same inventive idea, this application further provides a video playback apparatus. Referring to FIG. 8, the apparatus includes: a sending unit 801, a receiving unit 802, and a processing unit 803.

The sending unit 801 is configured to: send, for any video, a first video clip of the video to a video client for playback; send, when the playback of the first video clip ends, identifiers corresponding to M selectable second video clips of the video to the video client for display; notify the video client to count down a preset time; and send a second video clip determined by the processing unit 803 to the video client for display, the first video clip being an interaction pre-roll video clip of the second video clip; and M being an integer greater than 1.

The receiving unit 802 is configured to receive an identifier selected by a user and sent by the video client.

The processing unit 803 is configured to select a corresponding second video clip according to the identifier if the receiving unit 802 receives, in the preset time, the identifier selected by the user and sent by the video client.

In some embodiments, the sending unit 801 is further configured to notify, when sending the identifiers corresponding to the M selectable second video clips of the video to the video client for display, the video client to differently display the identifiers corresponding to the M selectable second video clips and a display background.

In some embodiments, the processing unit 803 is further configured to extract video data corresponding to a common pre-plot of M videos as the first video clip, and use video data in each video other than the video data used as the first video clip, as a second video clip; and use the first video clip corresponding to the M video clips and the M second video clips as one to-be-played-back video, and store the to-be-played-back video.

Units of the foregoing embodiment may be integrated, or may be separately deployed; and may be combined into one unit, or may be further divided into a plurality of subunits.

Each unit in each embodiment of the present disclosure may be implemented in a mechanical manner or an electronic manner. For example, one hardware module may include a specially designed permanent circuit or logic device (such as a dedicated processor, such as an FPGA or an ASIC) configured to complete a particular operation. The hardware module also may include a programmable logic device or circuit (for example, including a general-purpose processor or another programmable processor) provisionally configured by software and is configured to perform a particular operation. Whether the hardware module is specifically implemented in the mechanical manner, by using the dedicated permanent circuit, or by using the provisionally configured circuit (such as a circuit configured by software) may be decided in consideration of costs and time.

Figure 9:
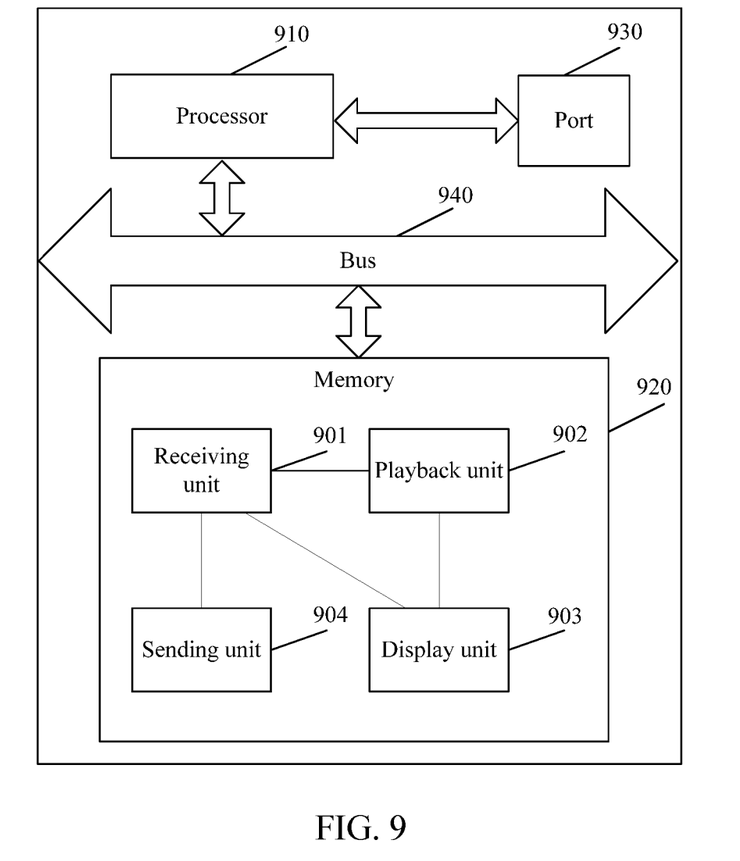
FIG. 9 is a schematic diagram of hardware architecture composition of a video client for video playback according to this application.

The video playback apparatus in this application is described above, hardware architecture composition of a video client in this application is provided below, and the video client is a programmable device that may integrate software and hardware. Specifically, referring to FIG. 9, FIG. 9 is a schematic diagram of hardware architecture composition of a video client for video playback according to an embodiment of the present disclosure. The video client may include: a processor 910, a memory 920, a port 930, and a bus 940. The processor 910 and the memory 920 are interconnected by using the bus 940. The processor 910 may obtain and output data by using the port 930.

When being executed by the processor 910, the receiving unit 701 may be configured to receive a first video clip sent by a video server; receive identifiers corresponding to M selectable second video clips that are used to display a video and that are sent by the video server and a preset time; receive an identifier selected by a user; and receive a second video clip sent by the video server.

When being executed by the processor 910, the playback unit 702 may be configured to play back, when the receiving unit 701 receives a first video clip of any video sent by the video server, the first video clip; and play back, when the receiving unit 701 receives a second video clip sent by the video server according to the identifier selected by the user, the second video clip.

When being executed by the processor 910, the display unit 703 may be configured to display, when the playback unit 702 ends the playback of the first video clip and the receiving unit 701 receives the identifiers corresponding to the M selectable second video clips that are used to display the video and that are sent by the video server and the preset time, the identifiers corresponding to the M selectable second video clips, and count down the preset time.

When being executed by the processor 910, the sending unit 704 may be configured to send, if the receiving unit 701 receives the identifier selected by the user in the preset time, the identifier selected by the user to the video server.

Therefore, it may be seen that, when being executed by the processor 910, an instruction module stored in the memory 920 may implement various functions of the receiving unit, the playback unit, the display unit, and the sending unit in the foregoing technical solution.

Figure 10:
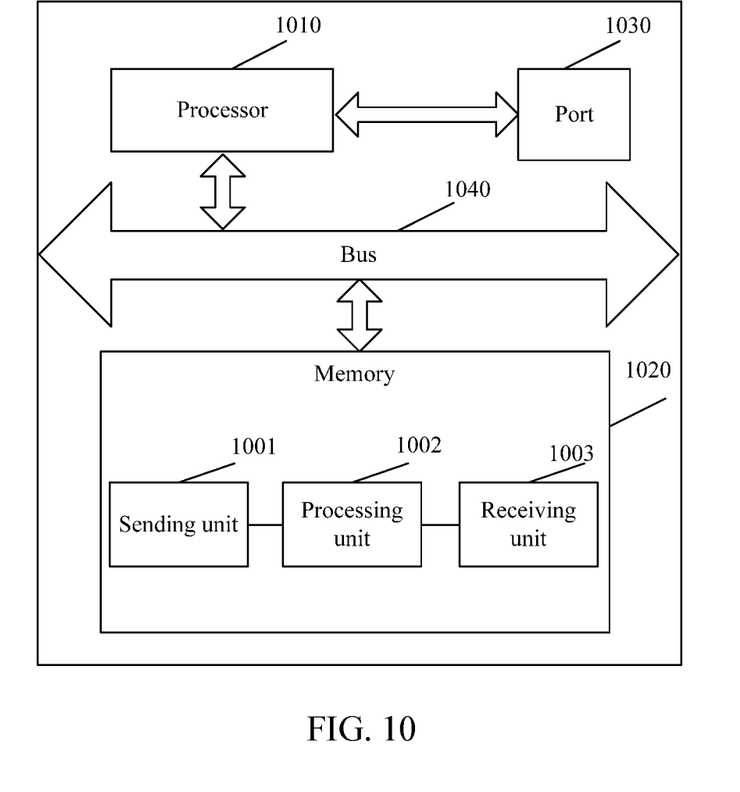
FIG. 10 is a schematic diagram of hardware architecture composition of a video server for video playback according to this application.

The video playback apparatus in this application is described above, hardware architecture composition of a video server in this application is provided below, and the video server is a programmable device that may integrate software and hardware. Specifically, referring to FIG. 10, FIG. 10 is a schematic diagram of hardware architecture composition of a video server for video playback according to an embodiment of the present disclosure. The video server may include: a processor 1010, a memory 1020, a port 1030, and a bus 1040. The processor 1010 and the memory 1020 are interconnected by using the bus 1040. The processor 1010 may obtain and output data by using the port 1030.

When being executed by the processor 1010, the sending unit 801 may be configured to: send, for any video, a first video clip of the video to a video client for playback; send, when the playback of the first video clip ends, identifiers corresponding to M selectable second video clips of the video to the video client for display; notify the video client to count down a preset time; and send a second video clip determined by the processing unit to the video client for display.

When being executed by the processor 1010, the receiving unit 802 may be configured to receive an identifier selected by a user and sent by the video client.

When being executed by the processor 1010, the processing unit 803 may be configured to select a corresponding second video clip according to the identifier if the receiving unit 802 receives, in the preset time, the identifier selected by the user and sent by the video client.

Therefore, it may be seen that, when being executed by the processor 1010, an instruction module stored in the memory 1020 may implement various functions of the sending unit, the receiving unit, and the processing unit in the foregoing technical solution.

In addition, an embodiment of the present disclosure may be implemented by a data processing program executed by a device such as a computer. Apparently, the data processing program constitutes this application. In addition, generally, a data processing program stored in a storage medium is directly read from the storage medium for execution or the program is installed on or replicated to a storage device (such as a hard disk or memory) of a data processing device for execution. Therefore, such a storage medium also constitutes this application. The storage medium may use any type of recording manner, such as a paper storage medium (such as a paper tape), a magnetic storage medium (such as a soft disk, a hard disk, or a flash memory), an optical storage medium (such as a CD-ROM), or a magneto-optical storage medium (such as an MO).

Therefore, this application further discloses a storage medium, which stores a data processing program. The data processing program is used for performing the foregoing technical solution of this application.

It should be noted that the video client shown in FIG. 9 and the video server shown in FIG. 10 are only one specific example, may be implemented by using another structure different from the structure described in this example, for example, an operation completed when the foregoing instruction code is executed, or may be implemented by an application-specific integrated circuit (ASIC). Additionally, there may be one or more processors 910 and processors 1010, and if there is a plurality of processors, the plurality of processors is jointly responsible for reading and executing the instruction code. Therefore, specific structures of the video server and the video client are not specifically limited in this application.

To sum up, in this application, when playback of first video clips used as interaction pre-roll video clips of M second video clips ends, identifiers corresponding to the M second video clips that may be selected by a user are provided, so that the user can actively select a second video clip to perform playback, so as to complete playback of a video. The technical solution can improve a video device processing capability, and resource utilization, and improve an interest of a user in actively participating in video interaction.

It can be known from the foregoing technical solution that, in this application, when playback of first video clips used as interaction pre-roll video clips of M second video clips ends, identifiers corresponding to the M second video clips that may be selected by a user are provided, so that the user can actively select a second video clip to perform playback, so as to complete playback of a video. The technical solution can improve a video device processing capability, and resource utilization.

Only preferred embodiments of the present disclosure are described above, and are not intended to limit this application. Any modifications, equivalent variations, and improvements made in accordance with the spirits and principles of this application shall fall within the protection scope of this application.

What is claimed is:

1. A video playback method, comprising:
receiving a first video clip of a video sent by a video server;
playing back the first video clip;
receiving, from the video server, identifiers corresponding to M selectable second video clips of the video and a preset time, M being an integer greater than 1;
displaying, when the playback of the first video clip ends, the identifiers corresponding to the M selectable second video clips, and counting down the preset time;
sending, if an identifier selected by a user is received in the preset time, the identifier selected by the user to the video server; and
playing back, when a second video clip sent by the video server according to the identifier selected by the user is received, the second video clip,
wherein the first video clip includes pre-interaction content of the second video clip; and
when the identifiers corresponding to the M selectable second video clips are received, the method further comprises: differentiating displaying of the identifiers corresponding to the M selectable second video clips and displaying of a display background of the video in a manner specified in a notification sent by the video server.

2. The method according to claim 1, further comprising:
beginning playback time counting of the video when the playback of the first video clip begins;
pausing the playback time counting of the video when the playback of the first video clip ends;
continuing the playback time counting of the video when the playback of the second video clip begins; and
ending the playback time counting of the video when the playback of the second video clip ends.

3. The method according to claim 1, wherein:
the playing back the first video clip comprises:
invoking, by a video player, an advertisement plug-in;
creating and loading, by the advertisement plug-in, a rich media container; and
reading, by the rich media container, a video material of the first video clip from the video server according to a video identifier (VID) of the first video clip, creating a primary plot advertisement video layer, playing back the video material of the first video clip, and starting a first timer;
the displaying the identifiers corresponding to the M selectable second video clips comprises:
pausing, by the rich media container, the playback of the video material of the first video clip when the first timer counts a specified breakpoint time of a primary plot advertisement;
creating and presenting, by the rich media container, a plot selection floating layer, and presenting the identifiers corresponding to the M selectable second video clips; and
the playing back the second video clip comprises:
reading, by the rich media container, a video material of the second video clip from the video server according to a VID of the second video clip, replacing the previously played-back video material of the first video clip with the video material of the second video clip, and continuing to play back the video material of the second video clip at the primary plot advertisement video layer.

4. The method according to claim 3, wherein the presenting the identifiers of the M second video clips comprises: presenting M corresponding option buttons according to the identifiers of the M second video clips at the plot selection floating layer.

5. The method according to claim 1, wherein
video control to play back the video material of the first video clip, and starting a first timer;
the displaying the identifiers corresponding to the M selectable second video clips comprises:
controlling, by the WebView page, the video control to pause the playback of the video material of the first video clip after the first timer counts a specified breakpoint time of a primary plot advertisement; and
the WebView page creating and presenting plot selection floating layer, presenting the identifiers of the M second video clips; and
the playing back the second video clip comprises:
reading, by the WebView page, a video material of the second video clip from the server according to a VID of the second video clip, replacing the video material of the first video clip played back in the video control with the video material of the second video clip, and playing back the video material of the second video clip.

6. The method according to claim 1, wherein the method further comprises:
returning to and continuing to perform, when a playback time of the first video clip plus a playback time of the second video clip is less than a preset total playback time length, the step of displaying the identifiers corresponding to the M selectable second video clips.

7. The method according to claim 1, further comprising:
filtering out in advance, from the M second video clips, a second video clip whose playback time is greater than a difference between a specified total playback time and a playback time of the first video clip.

8. The method according to claim 1, wherein the method further comprises:
stopping playing back the second video clip when a playback time of the second video clip plus a playback time of the first video clip is greater than a specified total playback time length and the total playback time length is reached.

9. The method according to claim 1, wherein the method further comprises:
reminding, when a playback time of the second video clip plus a playback time of the first video clip is greater than a specified total playback time length and the total playback time length is reached, the user that the playback of the current second video clip is not complete, and requesting the user to select whether to continue to play back the second video clip.

10. The method according to claim 1, further comprising: automatically selecting an identifier corresponding to a second video clip according to a preset rule if no identifier is selected by the user in the preset time, and sending the selected identifier corresponding to the second video clip to the video server.

11. A video playback apparatus, comprising:
a memory;
a display; and
a processor coupled to the memory and the display, the processor being configured to perform:

receiving a first video clip of a video sent by a video server;
playing back the first video clip;
receiving, from the video server, identifiers corresponding to M selectable second video clips of the video and a preset time, M being an integer greater than 1;
displaying, when the playback of the first video clip ends, the identifiers corresponding to the M selectable second video clips, and counting down the preset time;
sending, if an identifier selected by a user is received in the preset time, the identifier selected by the user to the video server; and
playing back, when a second video clip sent by the video server according to the identifier selected by the user is received, the second video clip,
wherein the first video clip includes pre-interaction content of the second video clip; and
the processor is further configured for differentiating displaying of the identifiers corresponding to the M selectable second video clips and displaying of a display background of the video in a manner specified in a notification sent by the video server.

12. The apparatus according to claim 11, wherein the processor is further configured for:
beginning playback time counting of the video when the playback of the first video clip begins;
pausing the playback time counting of the video when the playback of the first video clip ends;
continuing the playback time counting of the video when the playback of the second video clip begins; and
ending the playback time counting of the video when the playback of the second video clip ends.

13. A non-transitory computer readable storage medium, storing computer readable instructions, to cause at least one processor to perform:
receiving a first video clip of a video sent by a video server;
playing back the first video clip;
receiving, from the video server, identifiers corresponding to M selectable second video clips of the video and a preset time, M being an integer greater than 1;
displaying, when the playback of the first video clip ends, the identifiers corresponding to the M selectable second video clips, and counting down the preset time;
sending, if an identifier selected by a user is received in the preset time, the identifier selected by the user to the video server; and
playing back, when a second video clip sent by the video server according to the identifier selected by the user is received, the second video clip,
wherein the first video clip includes pre-interaction content of the second video clip; and
the computer readable instructions further cause the at least one processor to perform: differentiating displaying of the identifiers corresponding to the M selectable second video clips and displaying of a display background of the video in a manner specified in a notification sent by the video server.

14. The storage medium according to claim 13, wherein the computer readable instructions further cause the at least one processor to perform:
beginning playback time counting of the video when the playback of the first video clip begins;
pausing the playback time counting of the video when the playback of the first video clip ends;
continuing the playback time counting of the video when the playback of the second video clip begins; and ending the playback time counting of the video when the playback of the second video clip ends.

* * * * *